Patented Jan. 5, 1932

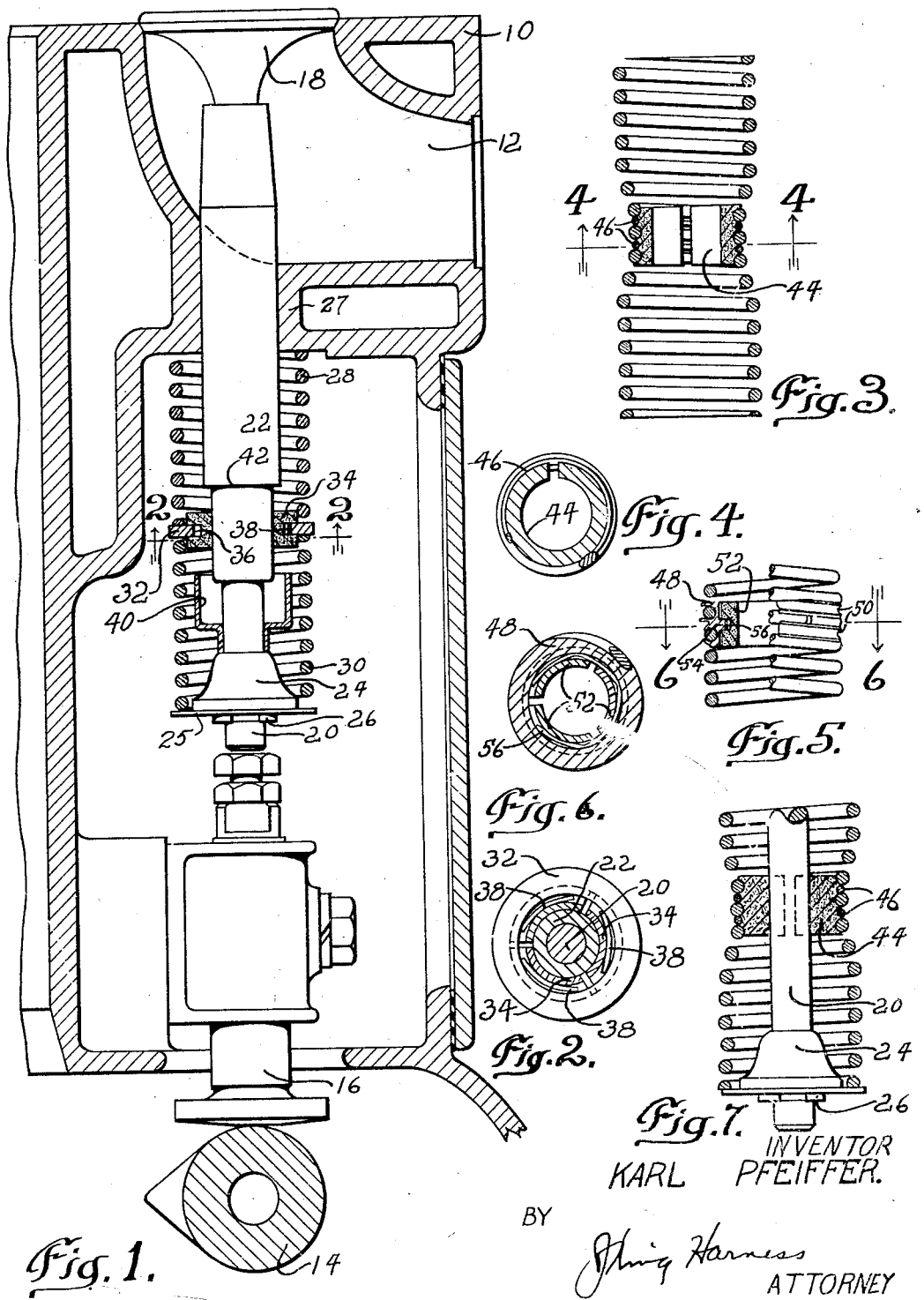

1,840,128

UNITED STATES PATENT OFFICE

KARL PFEIFFER, OF DETROIT, MICHIGAN, ASSIGNOR TO CHRYSLER CORPORATION, OF HIGHLAND PARK, MICHIGAN, A CORPORATION OF DELAWARE

VALVE SPRING

Application filed April 11, 1928. Serial No. 269,080.

This invention relates to a valve spring mechanism particularly adapted for use in internal combustion engines.

In the use of valve springs considerable difficulty has been experienced in the breaking of the springs due to their natural vibration. It is therefore an object of this invention to provide a means which dampens out the natural vibration of the spring.

Another object of the invention is to provide frictional resisting means to dampen out the vibrations of the spring.

More specifically stated the invention consists in providing a member centrally located throughout the length of the valve spring which is in frictional engagement with the valve stem guide.

These and other objects of the invention are more fully apparent from the following description taken in connection with the accompanying drawings, in which:

Fig. 1 is a vertical section through a portion of the motor block showing the valve mechanism, the valve spring and anti-vibration means also being shown in section.

Fig. 2 is a sectional view taken on line 2—2 of Fig. 1.

Fig. 3 is a modification of my improved device shown in section.

Fig. 4 is a sectional view on line 4—4 of Fig. 3.

Fig. 5 is a fragmentary view of the anti-vibration device as applied to adjacent ends of a two part valve spring, the anti-vibration device securing the two springs together.

Fig. 6 is a sectional view taken on line 6—6 of Fig. 5.

Fig. 7 is a further modification of my improved device showing the friction member frictionally engaging the valve stem.

Referring to the illustrated embodiment of my invention, a motor block 10 has been shown provided with an intake passage 12, cam shaft 14 and the usual valve mechanism which consists of a tappet 16, valve 18 and valve stem 20. A valve stem guide 22 has been shown in the block 10 and the lower end of the valve stem 20 is provided with the usual spring retainer consisting of a member 24 having a flange 25 and a locking member 26. The motor block is provided with a supporting portion 27 around the valve stem guide 22, forming an abutment for the upper end of the valve spring.

As shown in Fig. 1, a two part valve spring has been provided consisting of an upper spring 28 and lower spring 30. Between the adjacent ends of the springs I have provided a ring in the form of a washer 32 which forms an abutment for the ends of the springs and is adapted to receive friction members 34 in frictional engagement with the valve stem guide 22. As shown the friction members are provided with grooves 36 which fit the inner periphery of the washer 32 and a spring member 38 resiliently urges the friction members against the valve stem guide 22. Three friction members have been shown to facilitate their assembly in the washer 32 and to permit radial movement thereof.

It will be understood that as the valve is lifted by the cam 14, the compression of the spring causes the friction members to slide on the valve stem guide damping out the natural vibration of the spring.

As a means for permitting the operation of the valve when a spring is broken I have shown a stamped member 40 carried by the lower end of the valve stem adapted to form an abutment for the lower side of the friction members 34. A shoulder 42 has been provided on the valve stem guide 22. Should the spring 28 break the spring 30 will force the friction device upwardly against the shoulder 42 and the valve is seated by the spring 30. Should the spring 30 break the friction device is urged downwardly against the stamping 40 and the spring 28 seats the valve stem 20.

Referring to Fig. 3 I have shown a single spring having its center coils formed smaller than the other coils so that the friction members 44 may be carried thereby. The outer periphery of the friction members is spirally grooved thus permitting the friction members to be screwed into position. A coil spring 46 under radial tension has been provided around the outer periphery of the friction members 44 to further assure the engagement of the friction members against the valve stem guide 22.

When it is desired to secure the adjacent ends of two valve springs together as a unit I have shown, as in Fig. 5, a member 48 having spiral grooves in its outer periphery adapted to receive the adjacent ends of two springs and the edges of the grooves are shown pressed over the spring as at 50 to retain the springs in position. Friction members 52 corresponding to those shown in Fig. 1 have been provided on an inwardly projecting flange 54 and a spring 56 resiliently urges the friction members 52 radially against the outer periphery of the valve stem guide 22. The spring 56 as used in connection with devices shown in Figs. 1 and 5, may be a single spring as shown in Fig. 6 or may be a plurality of springs each adapted to urge a single friction member against the valve stem as shown in Fig. 2.

It will be obvious that the friction member may be in frictional engagement with the valve stem as shown in Fig. 7 and that various changes may be made in the arrangement, combination and construction of the various parts of my improved device without departing from the spirit of my invention and it is my intention to cover by my claims such changes as may be reasonably included within the scope thereof.

What I claim is:

1. A friction member of the class described comprising a ring, a plurality of friction elements mounted on the inner periphery of said ring, and resilient means between the inner periphery of said ring and said friction elements for urging the latter radially.

2. A friction member of the class described comprising a ring, a friction element mounted on the inner periphery of said ring, and resilient means for urging said friction element radially.

3. A device of the class described comprising a support, a valve stem guide projecting beyond said support, a valve stem in said guide, a spring abutment on said valve stem, means for lifting said valve stem, a coil spring between said abutment and said support for moving said valve stem in the opposite direction, frictional resisting means connected to said spring and in frictional engagement with said valve stem guide, an abutment on said guide at one side of said friction means and an abutment on said valve stem at the opposite side of said friction means, each adapted for engagement with said friction member when the spring is broken.

4. A device of the class described comprising a support, a valve stem guide projecting beyond said support, a valve stem in said guide, a spring abutment on said valve stem, means for lifting said valve stem, a coil spring between said abutment and said support for moving said valve stem in the opposite direction, a member connected to said spring and projecting inwardly therefrom, an abutment on said guide at one side of said member, and an abutment on said valve stem at the opposite side of said member, each adapted for engagement with said member when the spring is broken.

5. A device of the class described comprising a support, a valve stem guide projecting beyond said support, a valve stem in axial alignment in said guide, a spring abutment on said valve stem, means for lifting said valve stem, a pair of coil springs between said abutment and said support for moving said valve stem in the opposite direction, a member between the adjacent ends of said springs projecting inwardly from said springs, an abutment on said guide at one side of said member, and an abutment on said valve stem at the opposite side of said member, each abutment adapted for engagement with said member when either of said springs is broken.

KARL PFEIFFER.